(12) United States Patent
Audhkhasi et al.

(10) Patent No.: US 10,019,438 B2
(45) Date of Patent: Jul. 10, 2018

(54) EXTERNAL WORD EMBEDDING NEURAL NETWORK LANGUAGE MODELS

(71) Applicant: International Business Machines Corporation, Armonk, NY (US)

(72) Inventors: Kartik Audhkhasi, White Plains, NY (US); Bhuvana Ramabhadran, Mount Kisco, NY (US); Abhinav Sethy, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 15/074,354

(22) Filed: Mar. 18, 2016

(65) Prior Publication Data

US 2017/0270100 A1    Sep. 21, 2017

(51) Int. Cl.
| | |
|---|---|
| *G06F 17/27* | (2006.01) |
| *G06F 17/28* | (2006.01) |
| *G10L 25/30* | (2013.01) |
| *G10L 15/16* | (2006.01) |

(52) U.S. Cl.
CPC .......... *G06F 17/28* (2013.01); *G06F 17/2775* (2013.01); *G06F 17/2785* (2013.01); *G06F 17/274* (2013.01); *G10L 15/16* (2013.01); *G10L 25/30* (2013.01)

(58) Field of Classification Search
CPC combination set(s) only.
See application file for complete search history.

(56) References Cited

PUBLICATIONS

Audhkhasi, Kartik et al., "Semantic word embedding neural network language models for automatic: speech recognition", 2016 IEEE International Conference on Acoustics, Speech and Signal Processing (ICASSP), Mar. 20-25, 2016, 5 Pages.

Pennington, Jeffrey et al., "GloVe: Global Vectors for Word Representation", EMNLP 2014, The 2014 Conference on Empirical Methods in Natural Laguage Processing, Oct. 25-29, 2014, 12 pages.

Sethy, Abhinav et al. "Unnormalized exponential and neural network language", ICASSP 2015—2015 IEEE International Conference on Acoustics, Speech and Signal PRocessing (ICASSP), Apr. 19-24, 2015, 5 pages.

*Primary Examiner* — Vu B Hang
(74) *Attorney, Agent, or Firm* — Stephen R. Tkacs; Stephen J. Walder, Jr.; William J. Stock (57) ABSTRACT

A mechanism is provided in a data processing system for external word embedding neural network language models. The mechanism configures the data processing system with an external word embedding neural network language model that accepts as input a sequence of words and predicts a current word based on the sequence of words. The external word embedding neural network language model combines an external embedding matrix to a history word embedding matrix and a prediction word embedding matrix of the external word embedding neural network language model. The mechanism receives a sequence of input words by the data processing system. The mechanism applies a plurality of previous words in the sequence of input words as inputs to the external word embedding neural network language model. The external word embedding neural network language model generates a predicted current word based on the plurality of previous words. The mechanism processes a current word in the sequence of input words based on the predicted current word generated by the external word embedding neural network language model.

20 Claims, 5 Drawing Sheets

EXTERNAL WORD EMBEDDING NEURAL NETWORK LANGUAGE MODELS

BACKGROUND

The present application relates generally to an improved data processing apparatus and method and more specifically to mechanisms for external word embedding neural network language models.

Word embedding is the collective name for a set of feature representations in natural language processing where words or phrases from the vocabulary are mapped to vectors of real numbers in a low-dimensional space relative to the vocabulary size. Methods to generate this mapping include neural networks, dimensionality reduction on the word co-occurrence matrix, and explicit representation in terms of the context in which words appear. Word and phrase embeddings, when used as the underlying input representation, have been shown to boost the performance in natural language processing tasks such as syntactic parsing and sentiment analysis.

A statistical language model is a probability distribution over sequences of words. Given such a sequence, a language model assigns a probability to the whole sequence. Having a way to estimate the relative likelihood of different phrases is useful in many natural language processing applications. Language modeling is used in speech recognition, machine translation, part-of-speech tagging, parsing, handwriting recognition, information retrieval and other applications. In an n-gram language model, it is assumed that the probability of observing the $i^{th}$ word $w_i$ in the context history of the preceding i−1 words can be approximated by the probability of observing it in the shortened context history of the preceding n−1 words ($n^{th}$ order Markov property). The words bigram and trigram language model denote n-gram language models with n=2 and n=3, respectively. Continuous space language models use continuous representations or embeddings of words to make their predictions. Neural network based language models are an example but there are other varieties such as log-bilinear models. A positional language model is one that describes the probability of given words occurring close to one another in a text, not necessarily immediately adjacent.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for external word embedding neural network language models. The method comprises configuring the data processing system with an external word embedding neural network language model that accepts as input a sequence of words and predicts a current word based on the sequence of words. The external word embedding neural network language model combines an external embedding matrix both with a history word embedding matrix and a prediction word embedding matrix of the external word embedding neural network language model. The method further comprises receiving a sequence of input words by the data processing system. The method further comprises applying a plurality of previous words in the sequence of input words as inputs to the external word embedding neural network language model. The external word embedding neural network language model generates a predicted current word based on the plurality of previous words. The method further comprises processing a current word in the sequence of input words based on the predicted current word generated by the external word embedding neural network language model.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Semantic word embeddings have become increasingly important in natural language processing tasks over the last few years. This popularity is due to their ability to easily capture rich semantic information through a distributed representation and the availability of fast and scalable algorithms for learning them from large text corpora. State-of-the-art neural network language models (NNLMs) used in automatic speech recognition (ASR) and natural language processing also learn word embeddings optimized to model local N-gram dependencies given training text but are not optimized to capture semantic information. The illustrative embodiments leverage the fact that that external word embeddings, such as semantic word embeddings, provide diverse information compared to the word embeddings learned by NNLMs. The illustrative embodiments provide NNLM architectures that incorporate external word embeddings. The illustrative embodiments are not limited to semantic word embeddings, as the illustrative embodiments may use any algorithm that can produce external word embeddings to incorporate into the NNLM. For example, these algorithms may include word2vec or Glove, which produce semantic embeddings, or an algorithm that extracts acoustic embeddings using the input speech signal.

The illustrative embodiments apply the resulting NNLMs to ASR in both perplexity and word error rate. Other embodiments implement external word embedding neural network language models for other applications of natural language (NL) processing, such as part-of-speech tagging, parsing, machine translation, optical character recognition, handwriting recognition, spelling correction, or text input with automatic completion.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
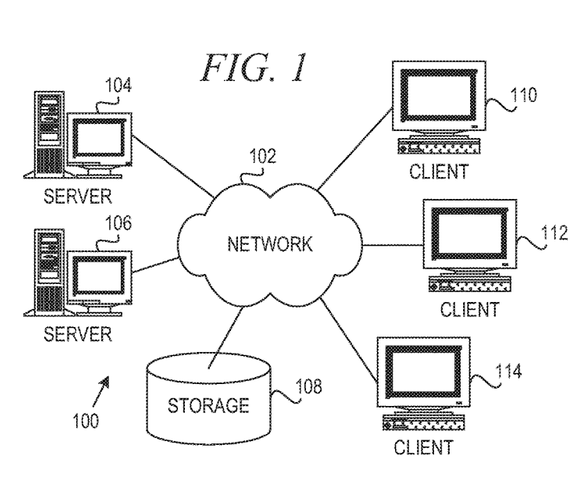
FIG. 1 is an example diagram of a distributed data processing system in which aspects of the illustrative embodiments may be implemented.
Figure 2:
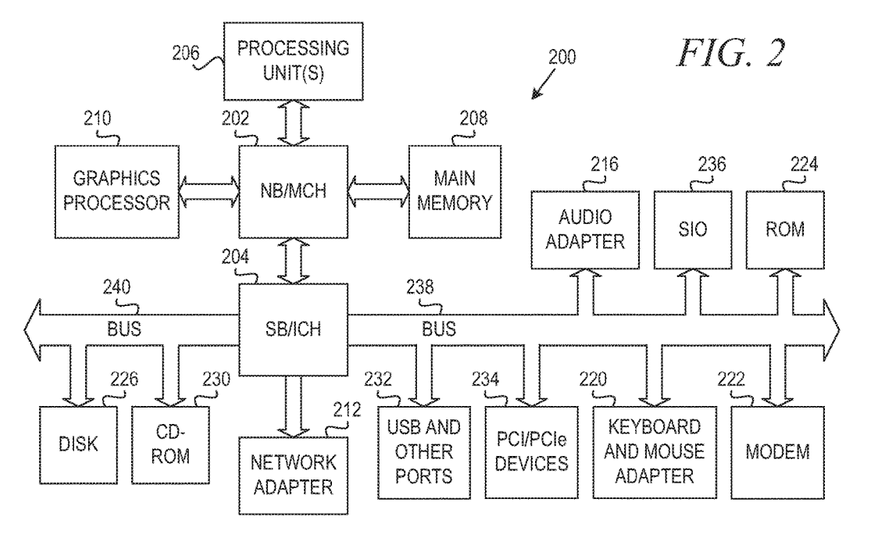
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a natural language (NL) processing system implementing external word embedding neural network language models. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates NL processing, such as automatic speech recognition (ASR), machine translation, optical character recognition, handwriting recognition, or text input with automatic completion.

As noted above, the mechanisms of the illustrative embodiments utilize specifically configured computing devices, or data processing systems, to perform the operations for external word embedding neural network language models for natural language processing. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the natural language processing using external word embedding neural network language models.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
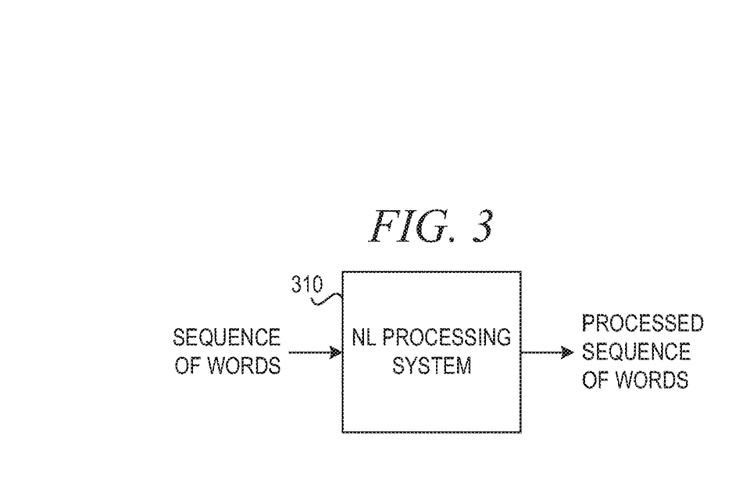
FIG. 3 is a block diagram illustrating a natural language (NL) processing system in accordance with an illustrative embodiment.

FIG. 3 is a block diagram illustrating a natural language (NL) processing system in accordance with an illustrative embodiment. More specifically, NL processing system 310 receives a sequence of words as input. In one embodiment, the sequence of words may comprise an audio signal with spoken words, an image containing a sequence of words, a stream of text words, or the like. For instance, NL processing system 310 may be an automatic speech recognition (ASR) system, machine translation system, optical character recognition (OCR) system, spell checking and correcting system, or the like.

Figure 4:
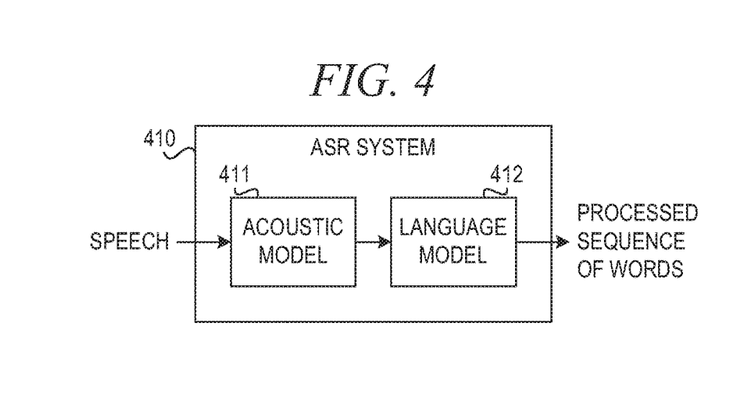
FIG. 4 is a block diagram illustrating an automatic speech recognition (ASR) system in accordance with an illustrative embodiment.

FIG. 4 is a block diagram illustrating an automatic speech recognition (ASR) system in accordance with an illustrative embodiment. Automatic speech recognition (ASR) system 410 comprises acoustic model 411 and language model 412. Acoustic model 411 is used in ASR to represent the relationship between an audio signal and the phonemes or other linguistic units that make up speech. The model is learned from a set of audio recordings and their corresponding transcripts, created by taking audio recordings of speech and their text transcriptions and using software to create statistical representations of the sounds that make up each word.

Language model 412 is a probability distribution over sequences of words. Given such a sequence, say of length m, it assigns a probability $P(w_1, \ldots, w_m)$ to the whole sequence. Having a way to estimate the relative likelihood of different phrases is useful in many natural language processing applications. Language modeling is used in speech recognition, machine translation, part-of-speech tagging, parsing, handwriting recognition, information retrieval and other applications.

In speech recognition, the computer tries to match sounds with word sequences. The language model provides context to distinguish between words and phrases that sound similar. For example, in American English, the phrases "recognize speech" and "wreck a nice beach" are pronounced almost the same but have very different meanings. These ambiguities are easier to resolve when evidence from the language model is incorporated with the pronunciation model and the acoustic model.

Continuous space language models use continuous representations or embeddings of words to make their predictions. Neural network (NN) based language models are an example but there are other varieties such as log-bilinear models. Continuous space embeddings help to alleviate the curse of dimensionality in language modeling: as language models are trained on larger and larger texts, the number of unique words (the vocabulary) increases and the number of possible sequences of words increases exponentially with the size of the vocabulary, causing a data sparsity problem because for each of the exponentially many sequences, statistics are needed to properly estimate probabilities. Neural networks avoid this problem by representing words in a distributed way, as non-linear combinations of weights in a neural net. The neural net architecture might be feed-forward, recurrent, or another type of neural network language model.

Recent advances in machine learning have led to the emergence of continuous distributed vector representations of words compared to traditional discrete and sparse representations such as one-hot encoding and bag of words. These distributed representations are often derived using algorithms that aim to capture semantic information from text. Two prominent examples include word2vec and Glove (global vectors for word representation). The continuous bag of word (CBOW) variant of word2vec learns word representations that best predict the current word in a sentence given the past and future words. This model takes the average of past and future word representations as input to a one hidden layer neural network to predict the current word. Another variant of the word2vec model, Skip-Gram, reverses this process and uses the embedding of the current word to predict the neighboring words.

Glove is similar in spirit to word2vec because it also tries to estimate word embeddings that capture word co-occurrence. However, Glove achieves this through a bilinear approximation of the word co-occurrence matrix. Let G denote the V×D matrix containing D-dimensional word embeddings for V words. Let C be the pairwise word co-occurrence matrix whose (i, j)$^{th}$ entry C(i, j) is the weighted count of the number of times words i and j occur within a window of length W words. Glove estimates the optimal G and a V-dimensional bias vector b using the following weighted least squares optimization problem:

$$G^*, b^* = \arg\min_{G,b} \sum_{i,j=1}^{V} f(C(i, j))(G(i)G(j)^T + b(i) + b(j) - \log C(i, j))^2,$$

where G(i) denotes the $i^{th}$ row of G and f is $$f(x)=\min\{1,(x/x_{min})^\alpha\}.$$

Typical values of $\alpha$ and $x_{min}$ are 0:75 and 100 respectively. Semantic word embeddings have found applications in several natural language processing (NLP) tasks including word similarity (analogy) detection, named entity recognition, machine translation, text classification, and dependency parsing.

The recent success of semantic word embeddings in NLP has occurred in parallel with the advent of neural network language models (NNLMs). Models such as feed-forward NNLMs (FNNLMs), recurrent NNLMs (RNNLMs), and uni-/bi-directional long-short term memory (LSTM) RNN-LMs are used in almost all state-of-the-art automatic speech recognition (ASR) systems in combination with the traditional N-gram LMs that do not learn a continuous distributed word representation.

Figure 5:
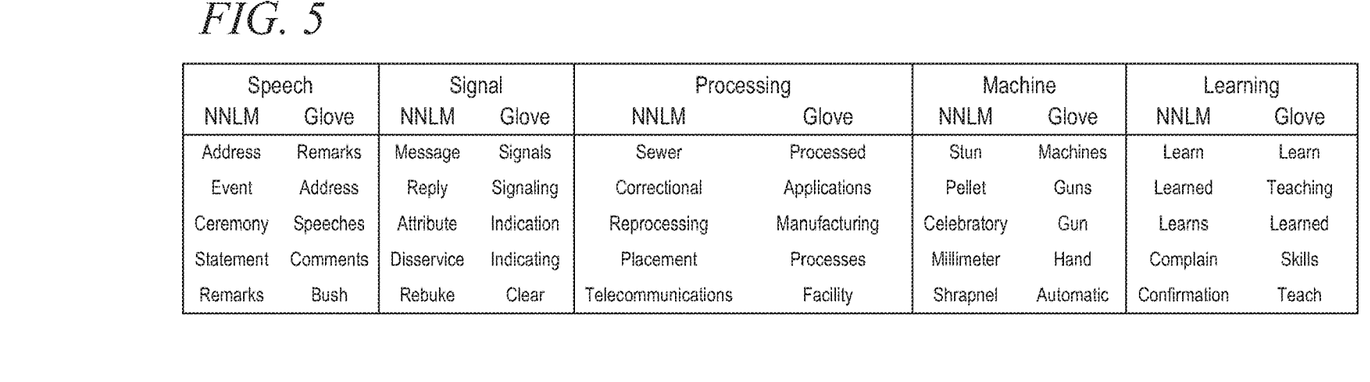
FIG. 5 is a table showing the top five words for each given word found using a neural network language model and external word embeddings in accordance with an illustrative embodiment.

FIG. 5 is a table showing the top five words for each given word found using a neural network language model and external embeddings in accordance with an illustrative embodiment. One key observation is that the word representations learned by any NNLM are tuned to best predicting the next word in a sentence because NNLM training uses average sentence log-likelihood as the objective function. As an example, FIG. 5 lists top-5 nearest words to five words found using cosine similarity on 300-dimensional NNLM and Glove embeddings. The NNLM embeddings are extracted from a FNNLM trained on a 12M broadcast news data set with a heldout set perplexity of 144.9, whereas the Glove embeddings are trained on the Gigaword corpus. We observe that the lists of words closest to a given word are different for NNLM and Glove. The differences in the top-5 similar word lists using the two embeddings highlight their diversity.

Figure 6:
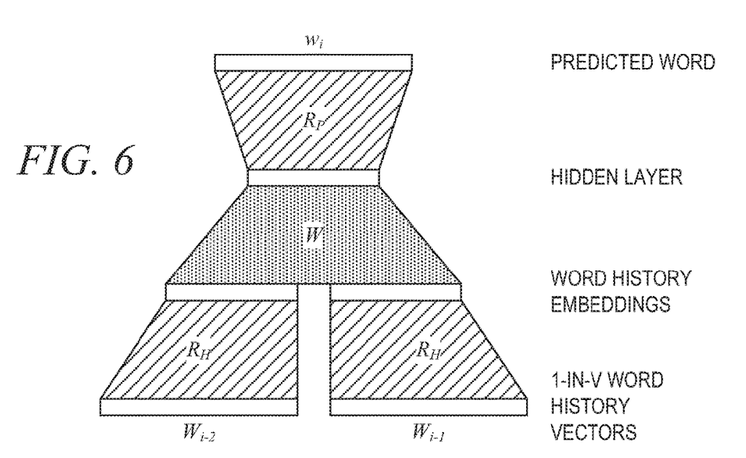
FIG. 6 depicts a traditional feed-forward neural network language model.

FIG. 6 depicts a traditional feed-forward neural network language model. The NNLM of FIG. 6 is a simple 3-gram FNNLM that takes two 1-in-V word history vectors as input, converts them to their D-dimensional embeddings, passes them through a feed-forward NN with a K-neuron hidden layer, and predicts a V-dimensional probability density function (PDF) for the next word.

Let $(w_{i-2}, w_{i-1}, w_i)$ be a tuple of three 1-in-V row vectors, where V is the vocabulary size. A feed-forward neural network language model (FNNLM) first converts the word history vectors $w_{i-2}$ and $w_{i-1}$ to their D-dimensional continuous representation through multiplication with $R_H$. This forms the input $$x_i=[w_{i-2}R_H \, w_{i-1}R_H]$$

to a neural network with one hidden layer. Let $$h_i=\sigma(x_iW)$$

be the 1×H vector at the output of the hidden layer, where σ denotes the point-wise sigmoid function. The NNLM then multiplies this vector with a H×V matrix $R_P$ and computes the conditional probability mass function of the next word:

$$P(w_i|w_{i-2}, w_{i-1})=s(h_iR_P)$$

where s is the V-way soft-max function. Vectors $w_{i-2}$ and $w_{i-1}$ contain 1-in-V bit vector encodings of the words in positions i−2 and i−1.

Figure 7:
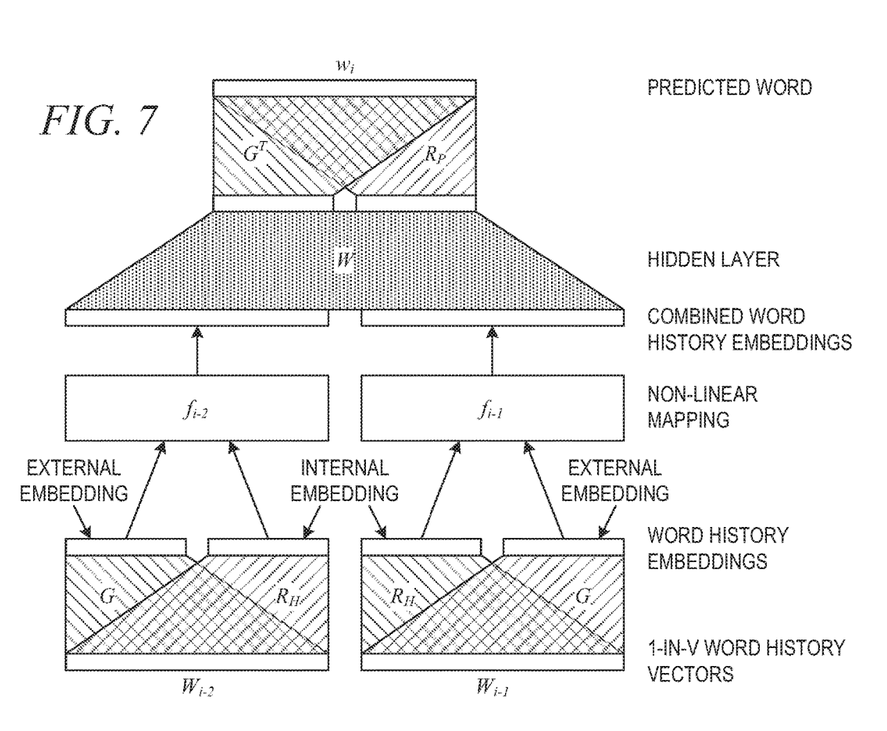
FIG. 7 depicts an external word embedding neural network language model architecture in accordance with an illustrative embodiment.

FIG. 7 depicts an external word embedding (EWE) FNNLM architecture in accordance with an illustrative embodiment. The EWE-FNNLM of FIG. 7 is a feed-forward 3-gram EWE-FNNLM that concatenates the $D_G$-dimensional external word embeddings such as the Glove semantic embeddings G to the history and prediction word embeddings $R_H$ and $R_P$. Let G be the V×$D_G$ external word embedding matrix obtained using any algorithm such as word2vec or Glove. $D_G$ is the dimension of the external word embeddings. The neural network in FIG. 7 incorporates external word embeddings at two stages—as new input features to the FNNLM and as additional weights connecting the hidden to the output layer. The new architecture thus includes the following two modifications:

(Feature concatenation) $R_H^G=[G \, R_H]$ and (Weight expansion) $R_P^G=[G \, R_P^T]^T$.

G is the external word embedding matrix. $R_H$ and $R_P$ denote the internal word embedding matrices of the history and predicted word. The T in superscript denotes transposition of the rows and columns on a matrix.

As shown in FIG. 7, non-linear mapping functions $f_{i-2}$ and $f_{i-1}$ map the external and internal word embeddings to common embeddings that are input to a feed-forward neural network. A general nonlinear mapping function can combine the external and internal word embeddings. The example embodiment shown here uses simple concatenation, which is subsumed by a general nonlinear mapping function.

Concatenating the external embedding matrix G to the word history embedding matrix $R_H$ is intuitive and is akin to feature stream combination. However, the weights of the hidden to output layer connections are viewed as a word embedding matrix $R_P$. Hence, the EWE-NNLM expands the hidden layer by the external embedding size $D_G$ and adds new connections between these new hidden neurons and the output layer with weight matrix $G^T$. Experiments illustrate that doing both feature concatenation and weight expansion using the external embedding matrix G gives significantly lower perplexity compared with only performing feature concatenation.

In addition to modifying the NNLM architecture, the EWE-NNLM of the illustrative embodiment also forces the gradients of the log-likelihood training objective function with respect to the external embedding matrix G to be 0. This means that the pre-trained external embeddings are not updated during NNLM training. First, this prevents the risk of these external embeddings becoming less diverse with respect to $R_H$ and $R_P$ as training proceeds. Second, this also keeps the total number of unknown model parameters only slightly greater than a vanilla NNLM due to a larger input to hidden layer weight matrix W.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
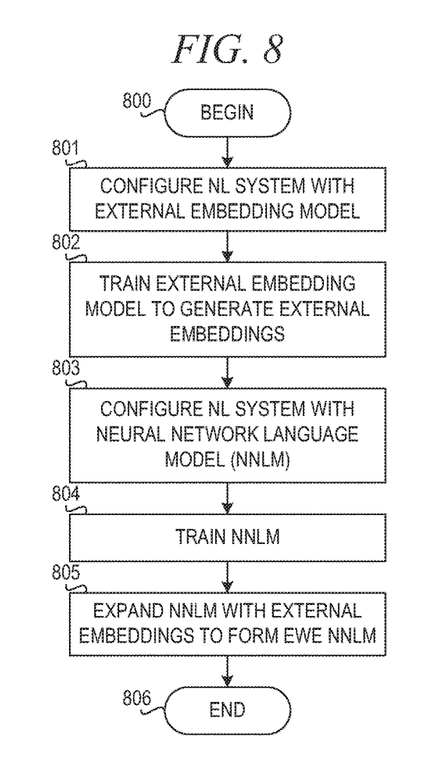
FIG. 8 is a flowchart illustrating configuring a natural language system with an external word embedding neural network language model in accordance with an illustrative embodiment.

FIG. 8 is a flowchart illustrating configuring a natural language system with an external word embedding neural network language model in accordance with an illustrative embodiment. Operation begins (block 800), and the system configures the natural language processing system with an external embedding model (block 801). The system trains the external embedding model to generate external embeddings (block 802). The system then configures the NL processing system with a neural network language model (NNLM) (block 803) and configures the NNLM (block 804). The system expands the NNLM with the external word embeddings to form a EWE-NNLM (block 805). Thereafter, operation ends (block 806).

Figure 9:
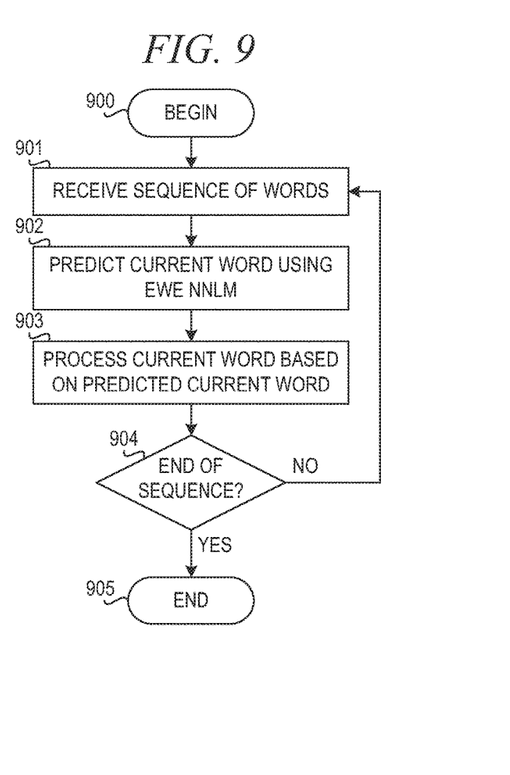
FIG. 9 is a flowchart illustrating operation of a natural language processing system in accordance with an illustrative embodiment.

FIG. 9 is a flowchart illustrating operation of a natural language processing system in accordance with an illustrative embodiment. Operation begins (block 900), and the NL processing system receives a sequence of words as input (block 901). The NL processing system predicts a current word using the EWE-NNLM (block 902). The NL processing system processes the current word in the sequence of words based on the predicted current word (block 903).

Then, the NL processing system determines whether the end of the sequence is reached (block 904). If the NL processing system determines that the end of the sequence of words is not reached, operation returns to block 901 to continue to receive the sequence of words. If the NL processing system determines that the end of the sequence of words is reached in block 904, then operation ends (block 905).

Figure 10:
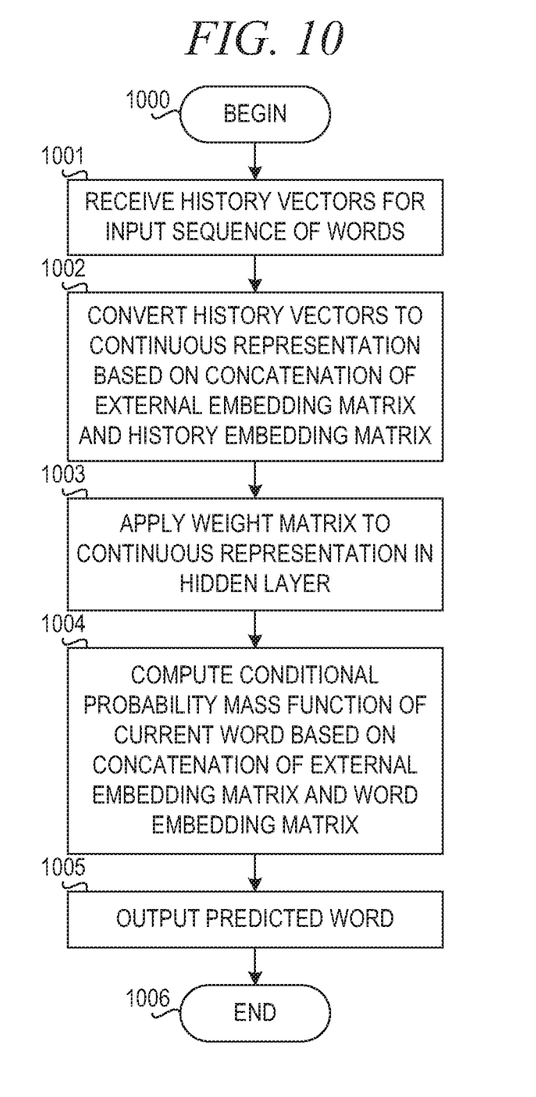
FIG. 10 is a flowchart illustrating operation of an external word embedding neural network language model in accordance with an illustrative embodiment.

FIG. 10 is a flowchart illustrating operation of an external word embedding neural network language model in accordance with an illustrative embodiment. Operation begins (block 1000), and the external word embedding neural network language model (EWE-NNLM) receives history vectors for an input sequence of words (block 1001). The EWE-NNLM converts the history vectors to a continuous representation based on a concatenation and non-linear combination of the external embedding matrix and the history embedding matrix (block 1002). The EWE-NNLM applies a weight matrix to the continuous representation in a hidden layer of the neural network (block 1003). The EWE-NNLM computes a conditional probability mass function of the current word based on a concatenation of the external embedding matrix and the word embedding matrix (block 1004). The SWE-NNLM then outputs the predicted word (block 1005). Thereafter, operation ends (block 1006).

While concatenation is used in the above example embodiment, the illustrative embodiments may use a non-linear mapping function to combine the external and internal word embeddings.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide models for incorporating external word embeddings (EWEs) in neural network language models (NNLMs). The resulting EWE-NNLMs perform better than traditional NNLMs because they use word embeddings that better capture information than the word embeddings learned in an NNLM. Experiments show significant improvements in both perplexity and word error rate (WER) for the case of feed-forward NNLMs (FNNLMs).

The illustrative embodiments may also extend the use of embeddings to recurrent neural networks (RNNs) to explore any additional temporal information that could be captured via the encoded co-occurrence information in the embeddings, in addition to the temporal context in the RNNs. The resulting EWE-RNN yields significant improvements in perplexity and reduction in WER.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions that are executed by the processor to specifically configure the processor to implement an automatic speech recognition system comprising an acoustic model and an external word embedding neural network language model, the method comprising:

configuring the automatic speech recognition system with an external word embedding neural network language model that accepts as input a sequence of words and predicts a current word based on the sequence of words, wherein the external word embedding neural network language model combines an external embedding matrix to a history word embedding matrix and a prediction word embedding matrix of the external word embedding neural network language model;

receiving as input an audio signal and generating a sequence of words based on the audio signal by the acoustic model;

receiving the sequence of input words by the automatic speech recognition system from the acoustic model;

applying a plurality of previous words in the sequence of input words as inputs to the external word embedding neural network language model in the automatic speech recognition system, wherein the external word embedding neural network language model generates a predicted current word based on the plurality of previous words; and processing, by the automatic speech recognition system, a current word in the sequence of input words based on the predicted current word generated by the external word embedding neural network language model, wherein processing the current word comprises recognizing a current spoken word in the audio signal based on the predicted current word.

2. The method of claim 1, wherein the external word embedding neural network language model generates input features from the plurality of previous words based on a concatenation of the external embedding matrix to the history word embedding matrix and provides the input features to a hidden layer of the external word embedding neural network language model.

3. The method of claim 2, wherein the plurality of previous words are provided to the external word embedding neural network as word history vectors, $w_{i-2}$ and $w_{i-1}$, and wherein the external embedding neural network language model generates the input features, $x_i$, as follows:

$$x_i = [w_{i-2} R_H^G \ w_{i-1} R_H^G],$$

where $R_H^G$ is the concatenation of the external embedding matrix to the history word embedding matrix.

4. The method of claim 3, wherein the external embedding neural network language model determines the concatenation of the external embedding matrix to the history word embedding matrix, $R_H^G$, as follows:

$$R_H^G = [G\ R_H],$$

where G is the external word embedding matrix and $R_H$ is the history word embedding matrix.

5. The method of claim 2, wherein a hidden layer of the external word embedding neural network language model applies a hidden layer weight matrix to the input features.

6. The method of claim 5, wherein the external embedding neural network language model determines an output of the hidden layer, $h_i$, as follows:

$$h_i = \sigma(x_i W),$$

where $\sigma$ is a point-wise sigmoid function, $x_i$ represents the input features, and W is the hidden layer weight matrix.

7. The method of claim 5, wherein the external word embedding neural network language model generates the predicted current word using weight expansion of the hidden layer based on a concatenation of the external embedding matrix to the prediction word embedding matrix.

8. The method of claim 7, wherein the external embedding neural network language model determines the predicted current word as a conditional probability mass function as follows:

$$P(w_i | w_{i-2}, w_{i-1}) = s(h_i R_P^G),$$

where s is a soft-max function, $h_i$ is an output of the hidden layer, and $R_P^G$ is the concatenation of the external embedding matrix to the prediction word embedding matrix.

9. The method of claim 8, wherein the external embedding neural network language model determines the concatenation of the external embedding matrix to the prediction word embedding matrix, $R_P^G$ as follows:

$$R_P^G = [G\ R_P^T]^T,$$

where G is the external word embedding matrix and $R_P$ is the prediction word embedding matrix.

10. The method of claim 1, wherein the external embedding matrix is generated using a semantic word embedding algorithm.

11. The method of claim 1, wherein the external embedding neural language model is a 3-gram feed-forward neural network language model.

12. A computer program product comprising a non-transitory computer readable storage medium having a computer readable program stored therein, wherein the computer readable program comprises:
an acoustic model that receives as input an audio signal and generates a sequence of words based on the audio signal by the acoustic model;
an external word embedding neural network language model that accepts as input a sequence of words and predicts a current word based on the sequence of words, wherein the external word embedding neural network language model combines an external embedding matrix to a history word embedding matrix and a prediction word embedding matrix of the external word embedding neural network language model;
instructions configured to execute on a computing device to cause the computing device to implement an automatic speech recognition system, wherein the instructions cause the computing device to:
receive the sequence of input words by the automatic speech recognition system from the acoustic model;
apply a plurality of previous words in the sequence of input words as inputs to the external word embedding neural network language model by the automatic speech recognition system, wherein the external word embedding neural network language model generates a predicted current word based on the plurality of previous words; and
process a current word in the sequence of input words based on the predicted current word generated by the external word embedding neural network language model in the automatic speech recognition system, wherein processing the current word comprises recognizing a current spoken word in the audio signal based on the predicted current word.

13. The computer program product of claim 12, wherein the external word embedding neural network language model generates input features from the plurality of previous words based on a concatenation of the external embedding matrix to the history word embedding matrix and provides the input features to a hidden layer of the external word embedding neural network language model.

14. The computer program product of claim 13, wherein a hidden layer of the external word embedding neural network language model applies a hidden layer weight matrix to the input features.

15. The computer program product of claim 14, wherein the external word embedding neural network language model generates the predicted current word using weight expansion of the hidden layer based on a concatenation of the external embedding matrix to the prediction word embedding matrix.

16. The computer program product of claim 12, wherein the external embedding matrix is generated using a semantic word embedding algorithm.

17. The computer program product of claim 12, wherein the external embedding neural language model is a 3-gram feed-forward neural network language model.

18. An apparatus comprising:
a processor; and
a memory coupled to the processor,
wherein the memory comprises:
an acoustic model that receives as input an audio signal and generates a sequence of words based on the audio signal by the acoustic model;
an external word embedding neural network language model that accepts as input a sequence of words and predicts a current word based on the sequence of words, wherein the external word embedding neural network language model combines an external embedding matrix to a history word embedding matrix and a prediction word embedding matrix of the external word embedding neural network language model; and
instructions which, when executed by the processor, cause the processor to implement an automatic speech recognition system, wherein the instructions cause the processor to:
receive the sequence of input words by the automatic speech recognition system from the acoustic model;
apply a plurality of previous words in the sequence of input words as inputs to the external word embedding neural network language model by the automatic speech recognition system, wherein the external word embedding neural network language model generates a predicted current word based on the plurality of previous words; and process a current word in the sequence of input words based on the predicted current word generated by the external word embedding neural network language model in the automatic speech recognition system, wherein processing the current word comprises recognizing a current spoken word in the audio signal based on the predicted current word.

19. The apparatus of claim 18, wherein the external word embedding neural network language model generates input features from the plurality of previous words based on a concatenation of the external embedding matrix to the history word embedding matrix and provides the input features to a hidden layer of the external word embedding neural network language model.

20. The apparatus of claim 19, wherein a hidden layer of the external word embedding neural network language model applies a hidden layer weight matrix to the input features.

* * * * *